United States Patent
Camenisch et al.

(10) Patent No.: US 9,755,832 B2
(45) Date of Patent: Sep. 5, 2017

(54) PASSWORD-AUTHENTICATED PUBLIC KEY ENCRYPTION AND DECRYPTION

(71) Applicant: INTERNATIONAL BUSINESS MACHINES CORPORATION, Armonk, NY (US)

(72) Inventors: Jan L. Camenisch, Thalwil (CH); Anja Lehmann, Zurich (CH); Gregory Neven, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 14/982,497

(22) Filed: Dec. 29, 2015

(65) Prior Publication Data

US 2017/0187528 A1 Jun. 29, 2017

(51) Int. Cl.
*H04L 9/14* (2006.01)
*H04L 9/00* (2006.01)
*H04L 29/06* (2006.01)

(52) U.S. Cl.
CPC ............... *H04L 9/14* (2013.01); *H04L 9/006* (2013.01); *H04L 63/083* (2013.01)

(58) Field of Classification Search
CPC ...... H04L 9/006; H04L 9/0816–9/0819; H04L 9/0838–9/0844; H04L 9/0861–9/0863; H04L 9/14–9/16; H04L 63/083–63/0846
See application file for complete search history.

(56) References Cited

U.S. PATENT DOCUMENTS

| 7,694,136 B2 | 4/2010 | Peyravian et al. |
| 7,861,078 B2 | 12/2010 | Funk |
| 9,071,598 B2 | 6/2015 | Ramzan et al. |
| 2004/0158714 A1 | 8/2004 | Peyravian et al. |

(Continued)

OTHER PUBLICATIONS

Badra, M., "Introducing Smartcards to remote authenticate passwrods using public key encryption", IEEE, http://eeexplore.ieee.org, pp. 1-2 (2004).*

(Continued)

*Primary Examiner* — Alexander Lagor
*Assistant Examiner* — Kevin Bechtel
(74) *Attorney, Agent, or Firm* — Cantor Colburn LLP; David Quinn

(57) ABSTRACT

Examples of techniques for password-authenticated public key encryption and decryption are disclosed. In one example implementation according to aspects of the present disclosure, a computer-implemented for password-authenticated public key decryption may include generating, by a first user processing system, a public key and a secret key and further generating an authenticated public key using the public key and an authentication password. The method may also include transmitting, by the first user processing system, the authenticated public key to a second user processing system. Additionally, the method may include receiving, by the first user processing system, a ciphertext from the second user processing system. The method may further include decrypting, by the first user processing system, the ciphertext using at least one of the secret key and the authentication password to generate a data message.

17 Claims, 8 Drawing Sheets

(56) References Cited

U.S. PATENT DOCUMENTS

| | | | |
|---|---|---|---|
| 2006/0224687 A1* | 10/2006 | Popkin | G06F 17/30132 709/217 |
| 2008/0320297 A1* | 12/2008 | Sabo | H04L 63/06 713/152 |
| 2010/0199095 A1* | 8/2010 | Ho | H04L 9/0844 713/171 |
| 2012/0082312 A1 | 4/2012 | Liu et al. | |
| 2015/0006887 A1 | 1/2015 | Brand | |
| 2015/0222628 A1 | 8/2015 | Karroumi et al. | |
| 2017/0063817 A1* | 3/2017 | Lester | H04L 63/0435 |
| 2017/0099137 A1* | 4/2017 | Pang | H04L 9/0825 |

OTHER PUBLICATIONS

L. Harn, D. Huang, C.S. Laih "Password Authentication using Public-Key Cryptography", Computers Math Applic. vol. 18, No. 12, pp. 1001-1017, (1989).

Badra, M., "Introducing Smartcards to remote authenticate passwrods using public key encryption", IEEE, http://ieeexplore.ieee.org, pp. 1-2 (2004).

Combined Search Report and Examination Report Under Section 17 and 18(3); International Application No. GB1621278.9; dated May 17, 2017, p. 1-7.

Jin-Meng Ho "A Versatile Suite of Strong Authenticated Key Agreement Protocols for Body Area Networks", IEEE Xplore, Wireless communications and Mobile Computing Conference 8th International, Sep. 27, 2012, p. 1-6.

\* cited by examiner

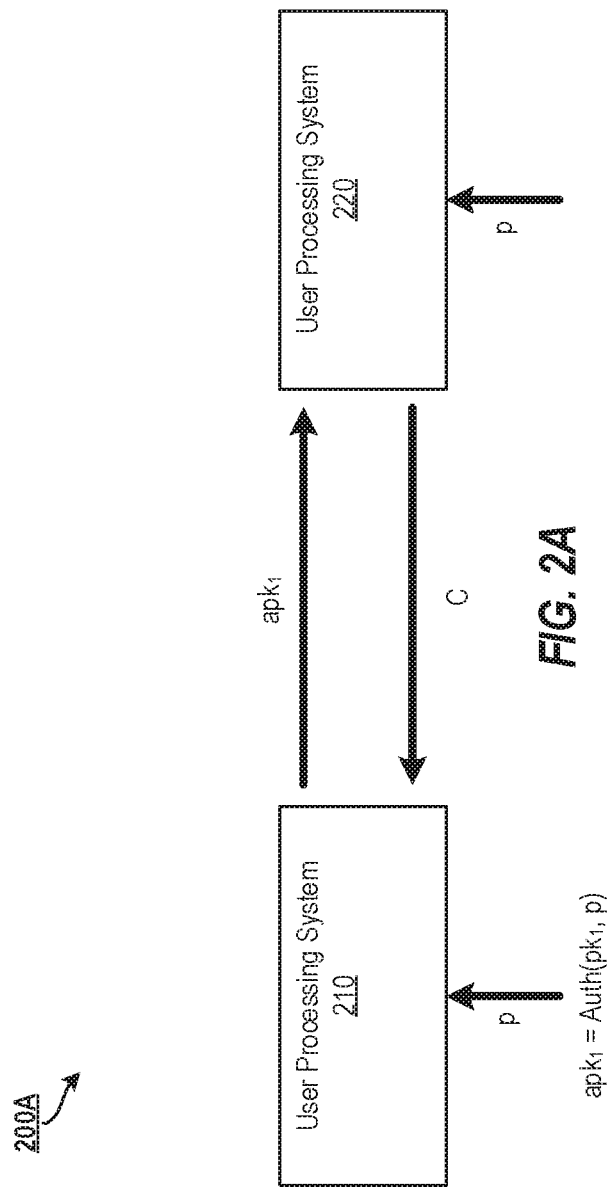

PASSWORD-AUTHENTICATED PUBLIC KEY ENCRYPTION AND DECRYPTION

BACKGROUND

The present disclosure relates to encryption and decryption techniques and, more particularly, relates to password-authenticated public key encryption and decryption techniques.

Users of processing systems (e.g., laptop computing devices, smart phone computing devices, tablet computing devices, desktop computing devices, wearable computing devices, etc.) may utilize remote data storage to store data such as pictures, videos, and personal documents. An example of remote data storage is cloud data storage.

In examples, a user may have a sending processing system (e.g., a smart phone computing device) and a receiving processing system (e.g., a tablet computing device). The user may upload data to a cloud host from the sending processing system. The user may then access/download the data from the cloud host using the receiving device. While this provides flexibility in uploading and download the data from many locations using a variety of processing systems, present techniques introduce security concerns. For example, user accounts at the cloud host are often protected by poorly chosen passwords. Additionally, the data itself is often stored unencrypted or encrypted under a key that is known to the cloud host, making the data vulnerable to insider attacks or cloud host compromise.

SUMMARY

In accordance with aspects of the present disclosure, a computer-implemented method for password-authenticated public key decryption is provided. The method may include generating, by a first user processing system, a public key and a secret key and further generating an authenticated public key using the public key and an authentication password. The method may also include transmitting, by the first user processing system, the authenticated public key to a second user processing system. Additionally, the method may include receiving, by the first user processing system, a ciphertext from the second user processing system. The method may further include decrypting, by the first user processing system, the ciphertext using at least one of the secret key and the authentication password to generate a data message.

In accordance with additional aspects of the present disclosure, a system for password-authenticated public key decryption is provided. The system comprises a processor in communication with one or more types of memory. The processor may be configured to generate a public key and a secret key and further generate an authenticated public key using the public key and an authentication password. The processor may also be configured to transmit the authenticated public key to a second user processing system. Additionally, the processor may be configured to receive a ciphertext from the second user processing system. The processor may be further configured to decrypt the ciphertext using at least one of the secret key and the authentication password to generate a data message.

In accordance with yet additional aspects of the present disclosure, a computer-implemented method for password-authenticated public key encryption is provided. The method may include receiving an authenticated public key generated by a first user processing system at a second user processing system, wherein the authenticated public key is generated using an authentication password. The method may also include encrypting, by the second user processing system, a data message to produce a ciphertext using the authenticated public key and the authentication password. The method may further include transmitting, by the second user processing system, the ciphertext to the first user processing system.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

FIG. 2A illustrates a block diagram of an environment for password-authenticated public key encryption and decryption according to examples of the present disclosure;

DETAILED DESCRIPTION

Various implementations are described below by referring to several examples of password-authenticated public key encryption techniques. The present techniques use a public/private key pair generated by each of the user's processing systems. A sending processing system encrypts the data under the public keys of the user's other processing systems. Each of the user's processing systems registers its public keys with the cloud host. Each of the public keys is authenticated with a low-entropy password (e.g., a password easily remembered by the user). To encrypt a message, the user enters the password on the sending processing system sending data to a cloud host. To decrypt a message, the user enters the same password on the receiving processing system accessing the data from the cloud host. If the passwords are different, then resulting ciphertext cannot be decrypted and the data remains hidden.

In some implementations, the present techniques provide for ease of use by the user because the user need only remember a basic password and not a strong cryptographic key while still providing data encryption. The present techniques also reduce the likelihood of a brute force dictionary attack. These and other advantages will be apparent from the description that follows.

Figure 1:
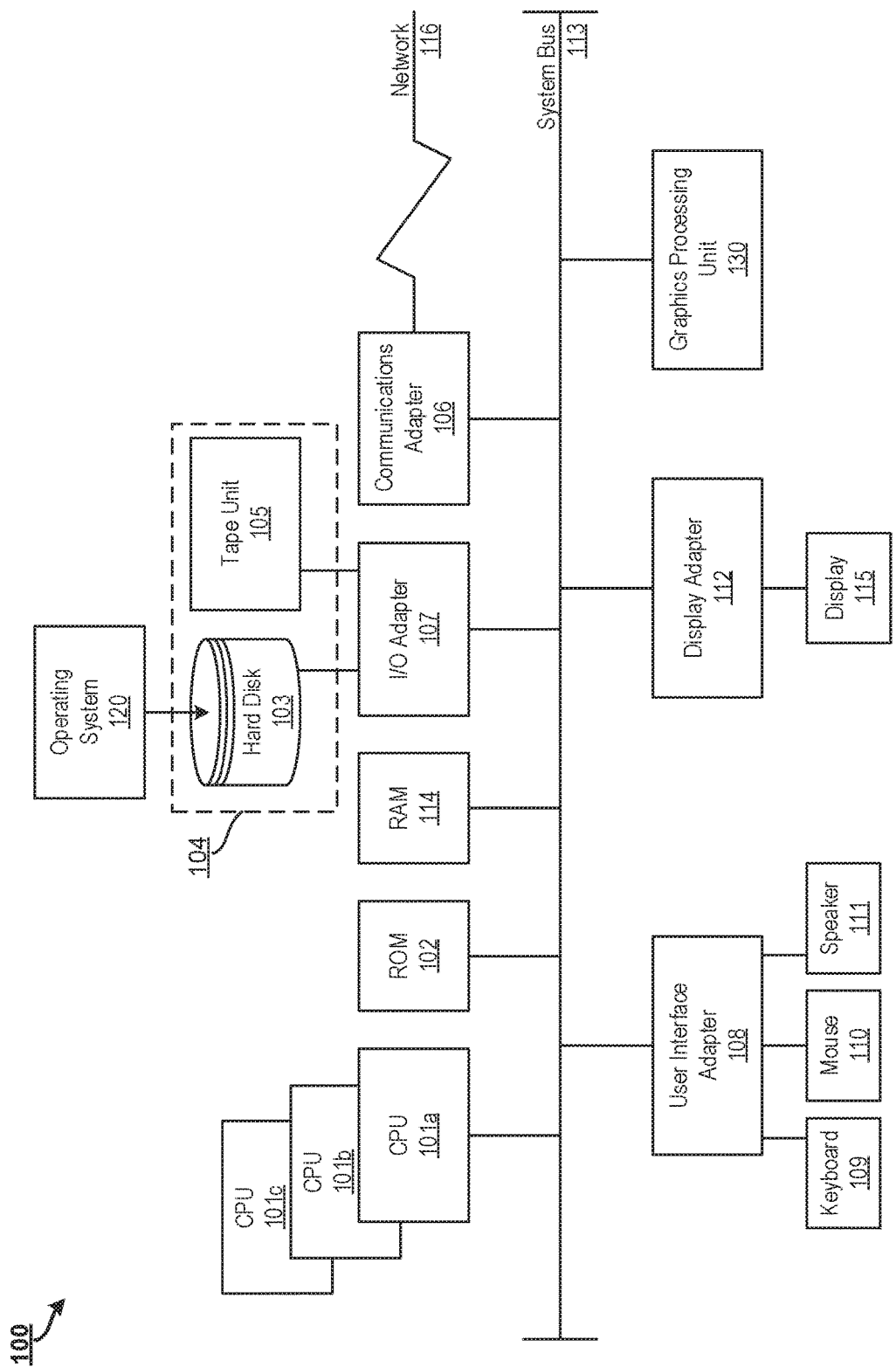
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

FIG. 2A illustrates a block diagram of an environment 200A for password-authenticated public key encryption and decryption according to aspects of the present disclosure. Environment 200A includes user processing system 210, and user processing system 220.

In examples according to aspects of the present disclosure, user processing system 210 generates a public key $pk_1$ and a secret (or private) key $sk_1$. User processing system 210 then generates an authenticated public key $apk_1$ using the public key $pk_1$ and an authentication password p received from a user of user processing system 210. A copy of authenticated public key $apk_1$ is transmitted to user processing system 220. User processing system 220 then creates a ciphertext C by encrypting a data message using the authenticated public key $apk_1$ received from user processing system 210 and the authentication password p and sends the ciphertext C to user processing system 210. User processing system 210 decrypts the ciphertext C using at least one of the secret key $sk_1$ and the authentication password to generate a data message.

It should be appreciated that the authentication password p of user processing system 210 is the same as the authentication password p of user processing system 220.

The following represents one possible password-authenticated public key encryption and decryption techniques according to aspects of the present disclosure. Let H:$\{0,1\}^* \to$ PKSpace be a hash function that maps bit strings to elements of the public key space. Let PKE=(Kg', Enc', Dec') be an ordinary (i.e., non-password-authenticated) public key encryption scheme where the public keys generated by Kg are uniformly distributed over the space PKSpace that forms a group under the operation $\odot$. As an example instantiation, PKE could be the ElGamal encryption scheme in a multiplicative group G=(g) of order q. A user's secret key is a random exponent $x \leftarrow_r Z_q$ and the user's corresponding public key is $y \leftarrow g^x$. This key generation technique induces a uniform distribution over G. The encryption of a data message m is ciphertext $C=(g^r, y^r_m)$ for $r \leftarrow_R Z_q$. Decryption of $C=(C_0, C_1)$ may be performed by computing $m \leftarrow C_1/C_0^r$.

Based on such an encryption scheme PKE and a hash function H, the following may represent a password-authenticated public key encryption technique:

Kg(k)=Kg'(k)
Auth(pk, p): Return apk$\leftarrow$pk$\odot$H(p)
Enc(apk, p, m): Compute pk$\leftarrow$apk$\odot$H(p)$^{-1}$; return C $\leftarrow$Enc'(pk, m)
Dec(sk, p, C): Return m$\leftarrow$Dec'(sk, C)

Figure 2B:
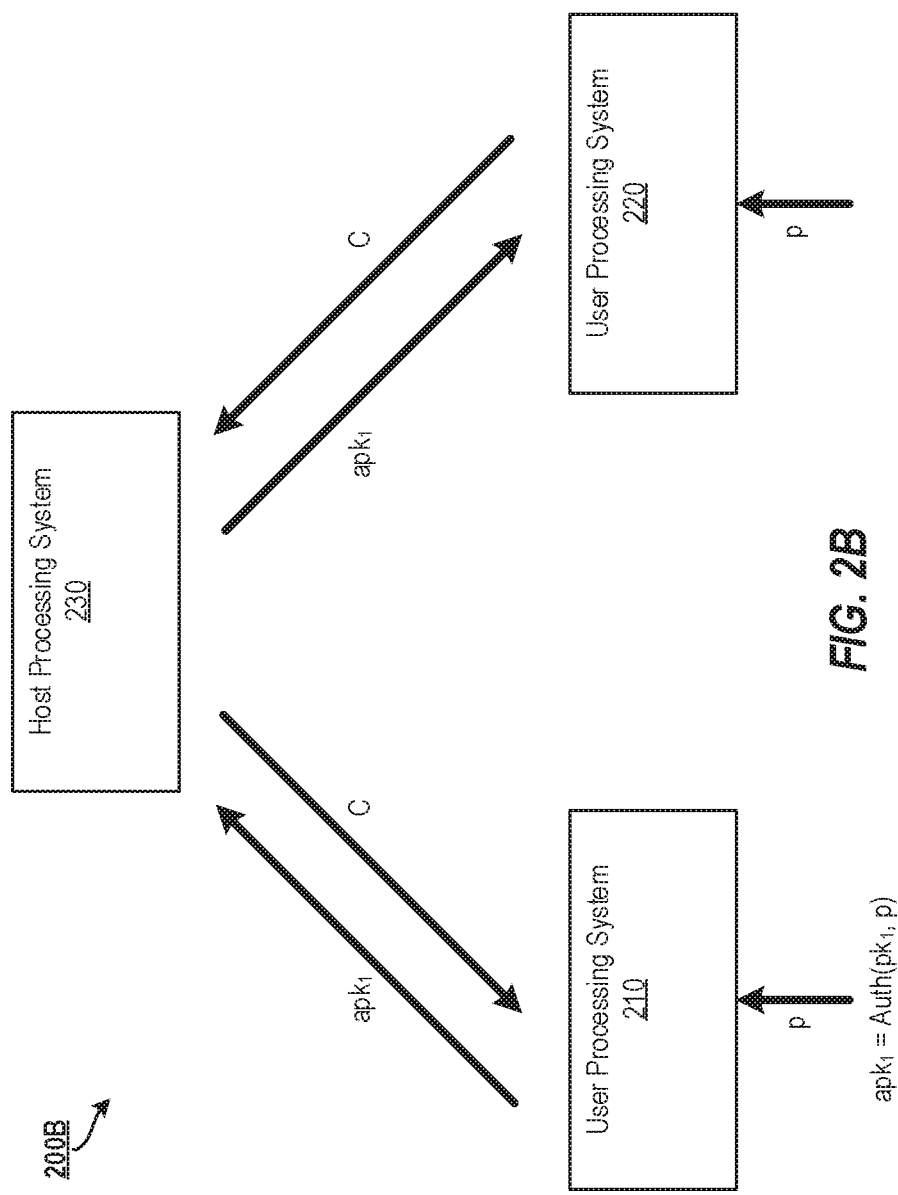
FIG. 2B illustrates a block diagram of an environment for password-authenticated public key encryption and decryption via a host processing system according to examples of the present disclosure.

FIG. 2B illustrates a block diagram of an environment 200B for password-authenticated public key encryption and decryption via a host processing system according to aspects of the present disclosure. Environment 200B includes user processing system 210, user processing system 220, and host processing system 230.

Host processing system 230 is responsible for storing data transmitted by either of the user processing systems 210, 220 and making the data available to user processing systems 210, 220, as well as any other user processing systems that may access the system using the techniques of the present disclosure. For example, the authenticated public key is transmitted by user processing system 210 to user processing system 220 via host processing system 230, and the ciphertext is received at user processing system 210 via host processing system 230. Similarly, the authenticated public key is transmitted by user processing system 210 to user processing system 220 via host processing system 230, and the ciphertext is received at user processing system 210 via host processing system 230. The authentication password is unknown to host processing system 230. In examples, host processing system 230 may be a cloud host or cloud system as described herein.

Although not illustrated in FIG. 2A or 2B, it should be appreciated that user processing system 210 may desire to send data back to user processing system 220. In this case, user processing system 220 generates its own public key $pk_2$ and secret key $sk_2$ and authenticates it with password $p_2$ to generate $apk_2$. Here, $p_2$ may be different from p above, but when user processing system 210 encrypts messages using $apk_2$, it must do so using the same password $p_2$ used by user processing system 220 to authenticate $apk_2$.

Figure 3:
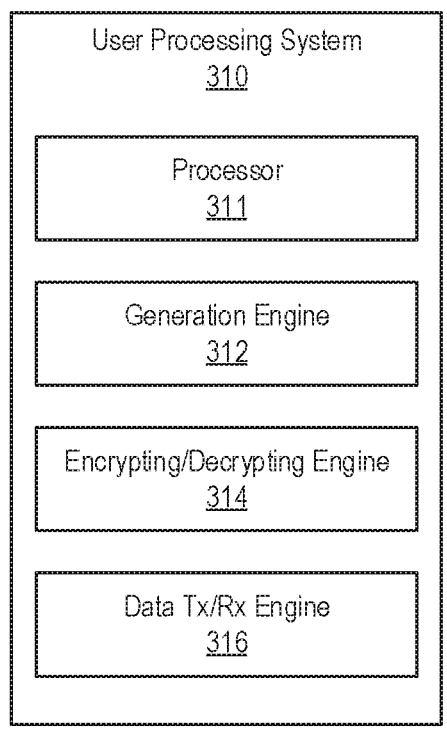
FIG. 3 illustrates a block diagram of a processing system for password-authenticated public key encryption and decryption according to examples of the present disclosure.

FIG. 3 illustrates a block diagram of a processing system 310 for password-authenticated public key encryption and decryption according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 311 for executing those instructions. Thus system memory 114 of FIG. 1 can be said to store program instructions that when executed by processing device 311 implement the engines described herein. Other engines may also be utilized to include other features and functionality described in other examples herein.

Processing system 310 may include processing device 311, a generation engine 312, an encrypting/decrypting engine 314, and a data Tx/Rx engine 316. Alternatively or additionally, the processing system 300 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Generation engine 312 generates a public key and a secret key and then generates an authenticated public key using the public key and an authentication password received from a user of processing system 310, such as through an input device (not shown).

Encrypting/decrypting engine 314 encrypts data messages into a ciphertext using the authenticated public key and the authentication password. Encrypting/decrypting engine 314 also decrypts ciphertexts using at least one of the secret key and the authentication password.

Data Tx/Rx engine 316 transmits data (e.g., authenticated public keys, ciphertexts, etc.) from user processing system 310 to other user processing systems and/or a host processing system and also receives data from the other user processing systems and/or the host processing system. In examples, data Tx/Rx may utilize a communications adapter (e.g., communications adapter 106 of FIG. 1) to transmit and/or receive data via a network (e.g., network 116 of FIG. 1).

Figure 4:
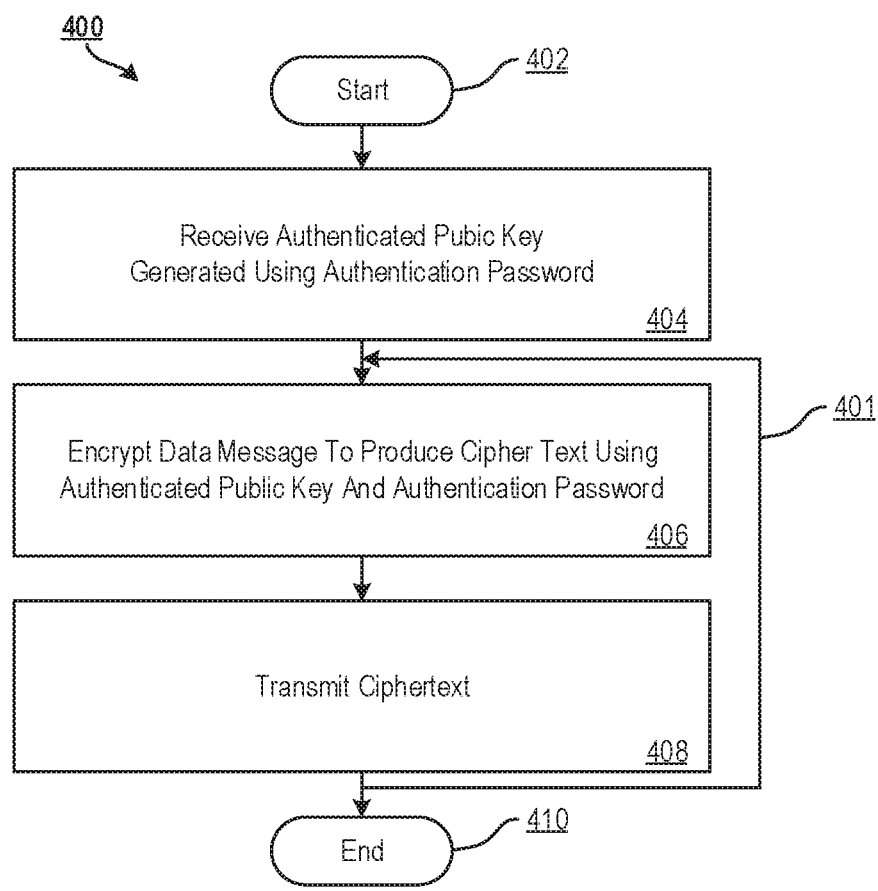
FIG. 4 illustrates a flow diagram of a method for password-authenticated public key encryption according to examples of the present disclosure.

FIG. 4 illustrates a flow diagram of a method 400 for password-authenticated public key encryption according to examples of the present disclosure. The method 400 starts at block 402 and continues to block 404.

At block 404, method 400 comprises receiving an authenticated public key generated by a first user processing system (e.g., user processing system 210 of FIG. 2A) at a second user processing system (e.g., user processing system 220 of FIG. 2A). The first user processing system generates the authenticated public key using an authentication password. For example, the first user processing system may utilize a key generation technique Kg that takes as an input a security parameter k∈N and generates the public key pk and the secret key sk. A key authentication technique Auth takes as an input the public key pk and an authentication password p and generates the authenticated public key apk. The password p may be user generated or automatically generated for the user. In examples, the authentication password p is a string of text or characters that are easy for the user to remember but are unknown to untrusted devices such as a host processing system (e.g., host processing system 230 of FIG. 2B). In examples, authenticated public keys do not reveal or allow offline dictionary attacks on the password that was used to authenticate the public key.

At block 406, method 400 comprises the second user processing system encrypting a data message to produce a ciphertext using the authenticated public key and the authentication password. The data message may be any data that a user desires to store remotely, such as on the host processing system or on another user processing system, using the encryption techniques of the present disclosure. In examples, the second user processing system may utilize an encryption technique Enc that takes as an input the authenticated public key apk, the password p, and the data message m to produce the ciphertext C. Ciphertexts generated under an honestly generated public key hide the encrypted message from an adversary who does not know the secret key, even if the adversary correctly guesses the password and sees the authenticated public key. Moreover, ciphertexts encrypted under an adversarially chosen (authenticated) public key do not reveal or enable offline dictionary attacks on the password that was used during the encryption.

At block 408, method 400 comprises the user processing system transmitting the ciphertext from the second user processing system to the first user processing system. Method 400 continues to block 410 and ends. In examples, rather than ending at block 410, method 400 flows back to block 406 and continues to encrypt additional data messages to produce additional ciphertexts and to transmit the additional ciphertexts as illustrated by arrow 401.

Additional processes also may be included. For example, the second user processing system may encrypt additional data messages to produce additional ciphertexts using the authenticated public key and authentication password and transmit the additional ciphertexts to the first user processing system. Additionally, the authenticated public key may be received by the second user processing system from the first user processing system via a host processing system, and the ciphertext may transmitted by the second user processing system to the first user processing system via the host processing system. In this case, the authentication password is unknown to the host processing system. It should be understood that the processes depicted in FIG. 4 represent illustrations, and that other processes may be added or existing processes may be removed, modified, or rearranged without departing from the scope and spirit of the present disclosure.

Figure 5:
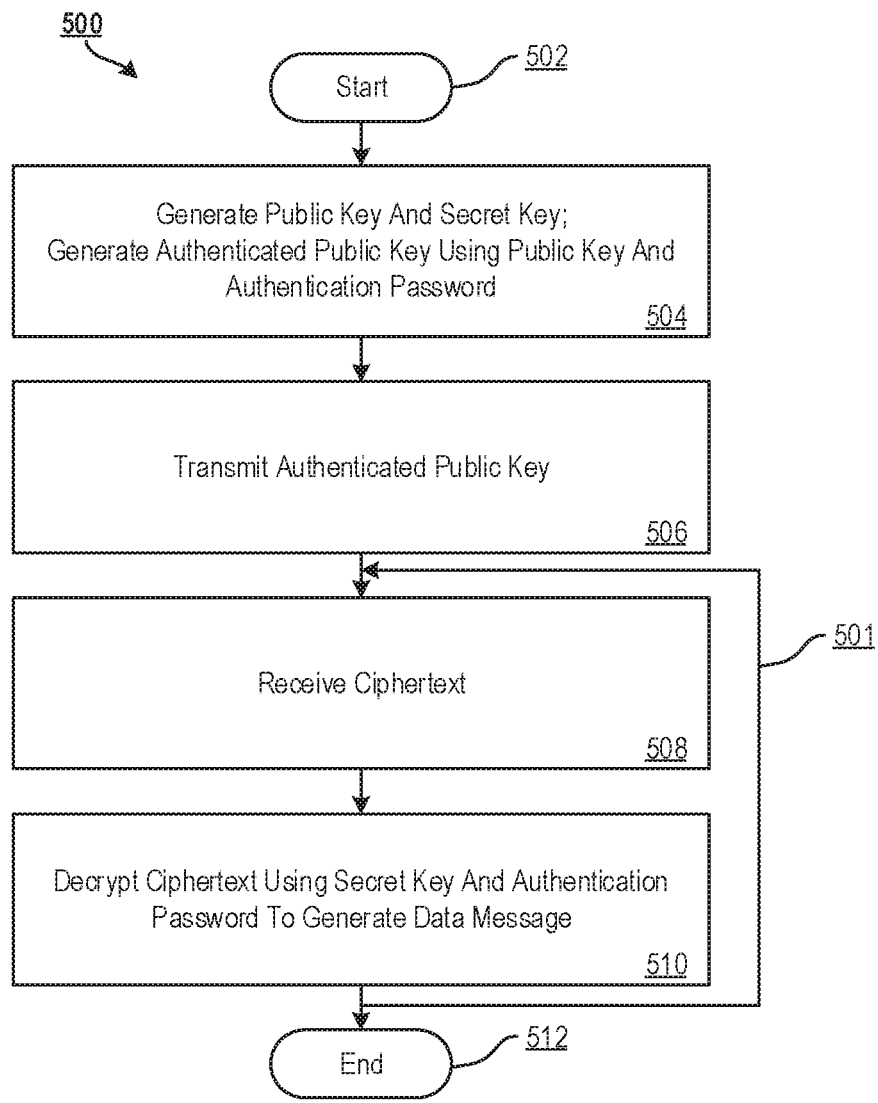
FIG. 5 illustrates a flow diagram of a method for password-authenticated public key decryption according to examples of the present disclosure.

FIG. 5 illustrates a flow diagram of a method 500 for password-authenticated public key decryption according to examples of the present disclosure. Method 500 starts at block 502 and continues to block 504.

At block 504, method 500 comprises a first user processing system (e.g., user processing system 210 of FIG. 2A) generating a public key and a secret key and further generating an authenticated public key using the public key and an authentication password using the techniques disclosed herein. At block 506, method 500 comprises the first user processing system transmitting the authenticated public key to a second user processing system (e.g., user processing system 220 of FIG. 2B). At block 508, method 500 comprises the first user processing system receiving a ciphertext from the second user processing system. At block 510, method 500 comprises the first user processing system decrypting the ciphertext using at least one of the secret key and the authentication password to generate a data message. Method 500 continues to block 512 and ends. In examples, rather than ending at block 512, method 500 flows back to block 508 and continues to receive additional ciphertexts and to decrypt the additional ciphertexts to produce additional data messages as illustrated by arrow 501.

Additional processes also may be included. For example, method 500 may comprise receiving additional ciphertexts from the second user processing device and decrypting the additional ciphertexts using at least one of the secret key and password to generate additional data messages. Additionally, the authenticated public key may be received by the second user processing system from the first user processing system via a host processing system, and the ciphertext may transmitted by the second user processing system to the first user processing system via the host processing system. In this case, the authentication password is unknown to the host processing system. Additionally, method 500 may comprise outputting the data message when the secret key is a correct secret key and the authentication password is a correct authentication password. However, if either or both of the secret key or the authentication password is not correct, method 500 may comprise outputting an error message.

It should be understood that the processes depicted in FIG. 5 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
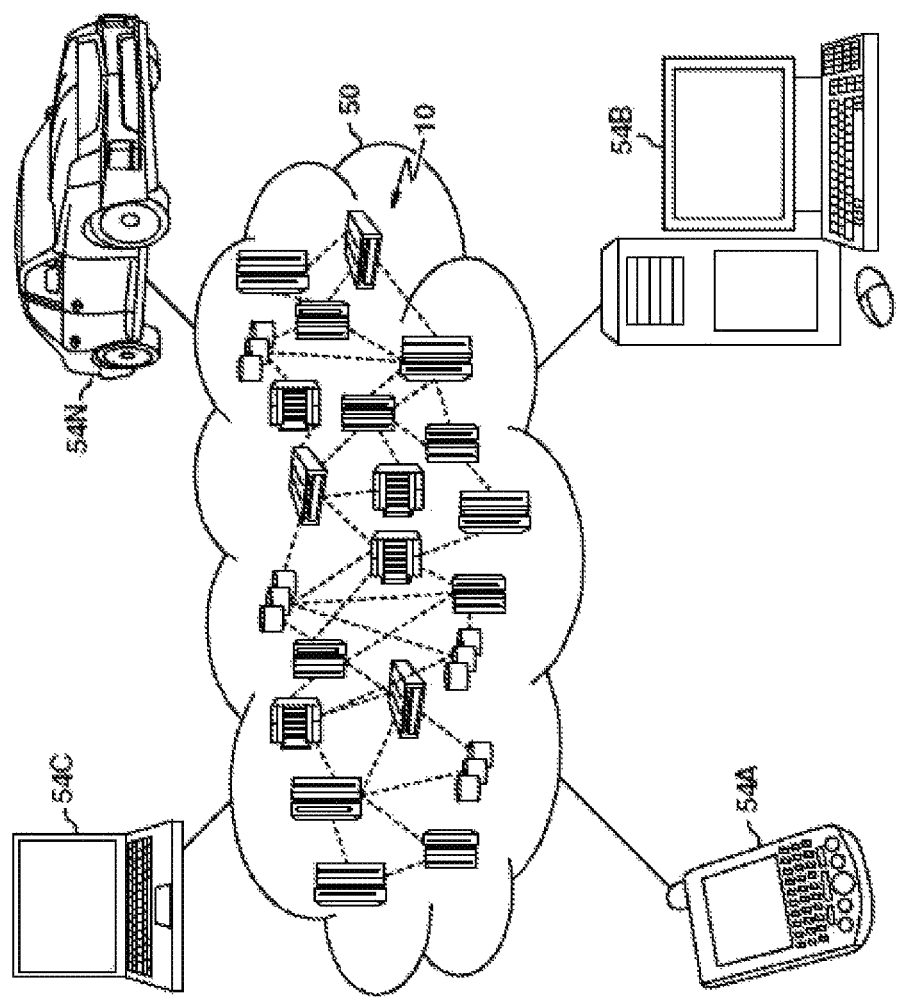
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
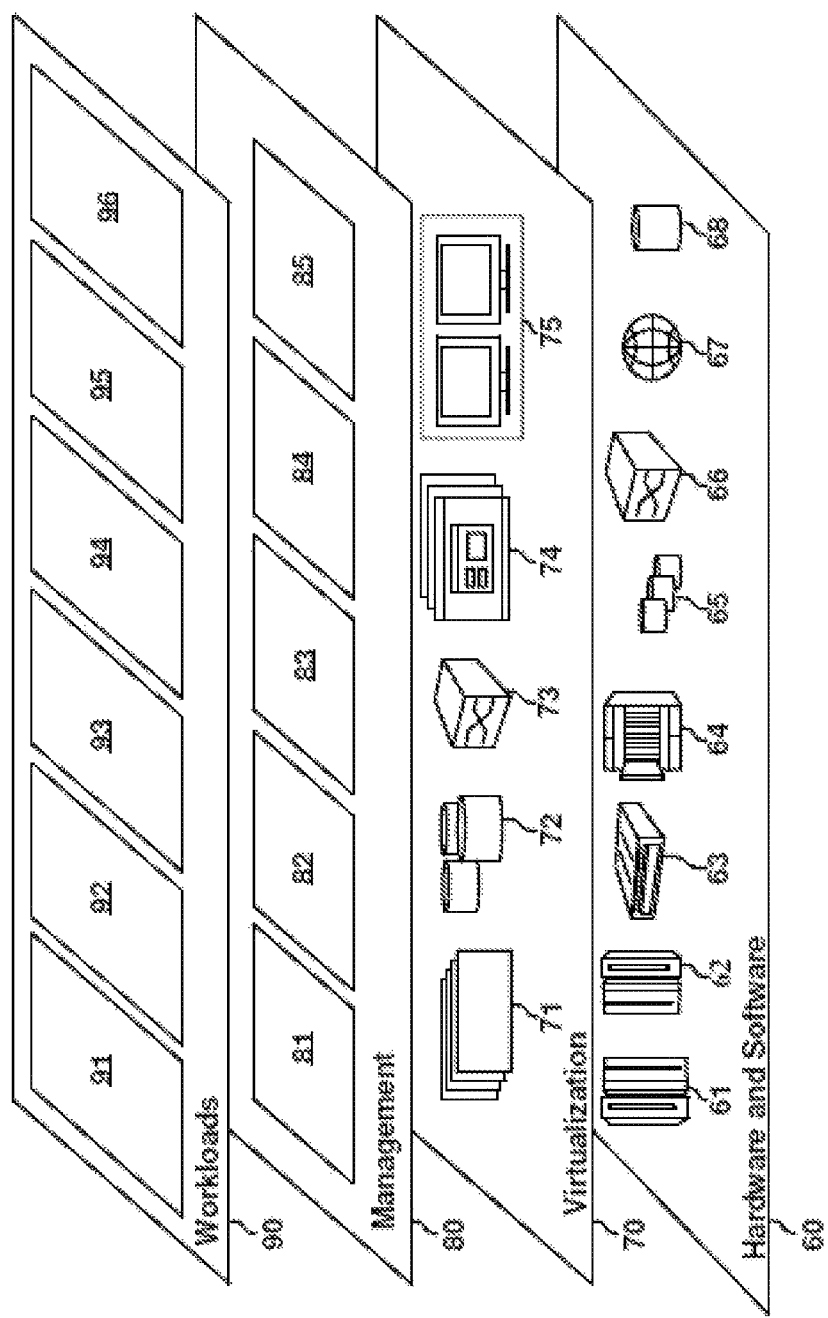
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and password-authenticated public key encryption and decryption 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for password-authenticated public key decryption, the method comprising:
   generating, by a first user processing system, a public key and a secret key and further generating an authenticated public key using the public key and a hash of an authentication password;
   transmitting, by the first user processing system, the authenticated public key to a second user processing system;
   receiving, by the first user processing system, a ciphertext from the second user processing system, wherein the ciphertext comprises a data message encrypted using the public key, wherein the second user processing system computed the public key using the authenticated public key received from the first user processing system and an inverse hash of the authentication password; and
   decrypting, by the first user processing system, the ciphertext using the secret key to generate the data message, wherein the authenticated public key is transmitted by the first user processing system to the second user processing system via a host processing system, wherein the ciphertext is received at the first user processing system via the host processing system, wherein the host processing system stores the authenticated public key and the ciphertext and makes the authenticated public key and the ciphertext available to the first user processing system and the second user processing system.

2. The computer-implemented method of claim 1, further comprising:
   receiving, by the first user processing system, a second ciphertext from the second user processing system.

3. The computer-implemented method of claim 2, further comprising:
   decrypting, by the first user processing system, the second ciphertext using at least one of the secret key and the authentication password to generate a second data message.

4. The computer-implemented method of claim 1, wherein the authentication password is unknown to the host processing system.

5. The computer-implemented method of claim 1, further comprising:
   outputting the data message responsive to the secret key being a correct secret key and the authentication password being a correct authentication password.

6. The computer-implemented method of claim 1, further comprising:
   outputting an error message responsive to the secret key being an incorrect secret key.

7. The computer-implemented method of claim 1, further comprising:
   outputting an error message responsive to the authentication password being an incorrect authentication password.

8. A first user processing system for password-authenticated public key decryption, the first user processing system comprising:
   a processing device and at least one-non-transitory computer-readable storage device with computer-executable instructions stored thereon that, when executed by the processor, cause the processor to:
   generate a public key and a secret key and further generate an authenticated public key using the public key and a hash of an authentication password;
   transmit the authenticated public key to a second user processing system;
   receive a ciphertext from the second user processing system, wherein the ciphertext comprises a data message encrypted using the public key, wherein the second user processing system computed the public key using the authenticated public key received from the first user processing system and an inverse hash of the authentication password; and decrypt the ciphertext using of the secret key to generate the data message, wherein the authenticated public key is transmitted by the first user processing system to the second user processing system via a host processing system, wherein the ciphertext is received at the first user processing system via the host processing system, and wherein the host processing system stores the authenticated public key and the ciphertext and makes the authenticated public key and the ciphertext available to the first user processing system and the second user processing system.

9. The first user processing system of claim 8, wherein the processing device is further configured to:

receive a second ciphertext from the second user processing system.

10. The first user processing system of claim 9, wherein the processing device is further configured to:

decrypt the second ciphertext using at least one of the secret key and the authentication password to generate a second data message.

11. The first user processing system of claim 8, wherein the authentication password is unknown to the host processing system.

12. The first user processing system of claim 8, wherein the processing device is further configured to:

output the data message responsive to the secret key being a correct secret key and the authentication password being a correct authentication password.

13. The first user processing system of claim 8, wherein the processing device is further configured to:

output an error message responsive to the secret key being an incorrect secret key.

14. The first user processing system of claim 8, wherein the processing device is further configured to:

output an error message responsive to the authentication password being an incorrect authentication password.

15. A computer-implemented method for password-authenticated public key encryption, the method comprising:

receiving an authenticated public key generated by a first user processing system at a second user processing system, wherein the authenticated public key is generated using a public key and a hash of an authentication password, wherein the public key has a corresponding secret key;

computing the public key using the authenticated public key received from the first user processing system and an inverse hash of the authentication password;

encrypting, by the second user processing system, a data message to produce a ciphertext using the public key, wherein the ciphertext comprises the data message encrypted using the public key; and transmitting, by the second user processing system, the ciphertext to the first user processing system, wherein the first user processing system can decrypt the ciphertext using the secret key to generate the data message, wherein the authenticated public key is transmitted by the first user processing system to the second user processing system via a host processing system, wherein the ciphertext is received at the first user processing system via the host processing system, and wherein the host processing system stores the authenticated public key and the ciphertext and makes the authenticated public key and the ciphertext available to the first user processing system and the second user processing system.

16. The computer-implemented method of claim 15, further comprising:

encrypting, by the second user processing system, a second data message to produce a second ciphertext using the authenticated public key and the authentication password.

17. The computer-implemented method of claim 16, further comprising:

transmitting, by the second user processing system, the second ciphertext to the first user processing system.

\* \* \* \* \*